(12) United States Patent
Sumiya

(10) Patent No.: US 10,195,942 B2
(45) Date of Patent: Feb. 5, 2019

(54) DISPLAY DEVICE

(71) Applicant: DENSO CORPORATION, Kariya, Aichi-pref. (JP)

(72) Inventor: Minoru Sumiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/744,016

(22) PCT Filed: Aug. 22, 2016

(86) PCT No.: PCT/JP2016/074314
§ 371 (c)(1),
(2) Date: Jan. 11, 2018

(87) PCT Pub. No.: WO2017/043291
PCT Pub. Date: Mar. 16, 2017

(65) Prior Publication Data
US 2018/0201133 A1 Jul. 19, 2018

(30) Foreign Application Priority Data
Sep. 8, 2015 (JP) ................................. 2015-176932

(51) Int. Cl.
*B60K 35/00* (2006.01)
*B60K 37/02* (2006.01)
*G01D 11/28* (2006.01)

(52) U.S. Cl.
CPC .............. *B60K 35/00* (2013.01); *B60K 37/02* (2013.01); *G01D 11/28* (2013.01)

(58) Field of Classification Search
CPC ................................ B60K 35/00; B60K 37/02
USPC ........................................................... 340/441
See application file for complete search history.

(56) References Cited

U.S. PATENT DOCUMENTS

| | | | |
|---|---|---|---|
| 7,866,859 B2 * | 1/2011 | Suzuki | B60K 37/02 116/62.4 |
| 7,938,334 B2 * | 5/2011 | Jesme | G06K 19/07749 235/380 |
| 8,814,375 B2 * | 8/2014 | Makita | G01D 13/28 362/23.01 |

(Continued)

FOREIGN PATENT DOCUMENTS

| | | |
|---|---|---|
| JP | H08159821 A | 6/1996 |
| JP | 2000240415 A | 9/2000 |

(Continued)

*Primary Examiner* — Santiago Garcia
(74) *Attorney, Agent, or Firm* — Harness, Dickey & Pierce, P.L.C.

(57) ABSTRACT

In a display device, when an ignition switch of a vehicle is off, an external light entering toward a front side of a meter panel is reflected on a smoke layer and a second light shielding layer, and a decorative part and a predetermined zone are, as a whole, viewed through a second opening as being in a ring shape with a width of the second opening and of a color tone based on the smoke layer and the second light shielding layer. When the ignition switch of the vehicle is on, the predetermined zone is illuminated in a predetermined color by a light emitted by a light source with a width of the first opening to be viewed as being wider than the decorative part.

4 Claims, 7 Drawing Sheets

(56) References Cited

U.S. PATENT DOCUMENTS

| | | | | |
|---|---|---|---|---|
| 8,911,097 | B2* | 12/2014 | Sung | G02F 1/1335 |
| | | | | 359/609 |
| 9,228,864 | B2* | 1/2016 | Dyer | G01D 11/28 |
| 9,482,798 | B2* | 11/2016 | Lee | G02B 5/206 |
| 9,523,593 | B2* | 12/2016 | Kunitachi | G01D 11/28 |
| 9,651,779 | B2* | 5/2017 | Takasu | G02B 27/01 |
| 9,718,399 | B2* | 8/2017 | Nirei | G01D 11/28 |
| 9,890,927 | B2* | 2/2018 | Nakajima | F21V 7/0008 |
| 9,937,874 | B2* | 4/2018 | Nakajima | B60K 37/04 |
| 2012/0202081 | A1* | 8/2012 | Takahashi | G02B 5/003 |
| | | | | 428/473.5 |
| 2013/0114240 | A1* | 5/2013 | Makita | G01D 13/28 |
| | | | | 362/23.19 |
| 2013/0257609 | A1* | 10/2013 | Otsuji | B62J 99/00 |
| | | | | 340/441 |
| 2014/0036472 | A1* | 2/2014 | Ishihara | F21V 33/00 |
| | | | | 362/23.14 |
| 2014/0285334 | A1* | 9/2014 | Sano | B60K 35/00 |
| | | | | 340/441 |
| 2016/0082876 | A1* | 3/2016 | Dyer | G01D 13/265 |
| | | | | 340/441 |
| 2016/0221440 | A1* | 8/2016 | Tane | B60K 35/00 |

FOREIGN PATENT DOCUMENTS

| | | |
|---|---|---|
| JP | 2008039702 A | 2/2008 |
| JP | 2013205395 A | 10/2013 |

\* cited by examiner

DISPLAY DEVICE

CROSS REFERENCE TO RELATED APPLICATIONS

This application is a U.S. National Phase Application under 35 U.S.C. 371 of International Application No. PCT/JP2016/074314 filed on Aug. 22, 2016 and published in Japanese as WO 2017/043291 A1 on Mar. 16, 2017. This application is based on and claims the benefit of priority from Japanese Patent Application No. 2015-176932 filed on Sep. 8, 2015. The entire disclosures of all of the above applications are incorporated herein by reference.

TECHNICAL FIELD

The present disclosure relates to a display device, which is suitably applicable to, for example, a combination meter for vehicle.

BACKGROUND ART

Known display devices include, for example, one disclosed in Patent Literature 1. The display device according to Patent Literature 1 includes a rotation speed display panel to display the rotation speed of an internal combustion engine. The rotation speed display panel is circularly shaped and includes a numeric part and a graduation part which are formed on the outer peripheral side of the rotation speed display panel and extend in a circumferential direction of the rotation speed display panel. In the rotation speed display panel, a pointer turns pointing to the rotation speed of the internal combustion engine.

In a predetermined area of the graduation part, a red zone is formed as a predetermined zone to present a warning display representing a rotation speed range exceeding an upper-limit rotation speed of the internal combustion engine. The red zone is distinguished, for example, by color to be clearly discernable by a driver.

However, the red zone (predetermined zone) according to Patent Literature 1 is a belt-like design for merely displaying a rotation speed range exceeding an upper-limit rotation speed of the internal combustion engine. In recent years, demand has been rising for a new form of display by a display device.

PRIOR ART LITERATURE

Patent Literature

Patent Literature 1: JP 2000-240415 A

SUMMARY OF INVENTION

An object of the present disclosure is to provide a display device capable of presenting a new form of display beyond merely displaying a predetermined zone.

A display device according to an embodiment of the present disclosure includes a display part formed on a translucent meter panel to display information items related with a vehicle, a ring-shaped decorative part formed in the display part to extend in a circumferential direction of the display part, and a predetermined zone for displaying a predetermined information area at a part of the decorative part. The display device further includes a first light shielding layer, a delustered layer, a smoke layer, a second light shielding layer and a light source. The first light shielding layer is formed of a light-shielding material on a viewable front-side surface of the meter panel, and has a first opening defining an opening corresponding to the decorative part. The delustered layer is formed of a delustering material on a surface of the first light shielding layer, and has a second opening defining an opening having a smaller width than the first opening in an inside area of the first opening. The smoke layer is formed of a black-based smoky translucent material on a rear-side surface of the meter panel at a position corresponding to the predetermined zone. The second light shielding layer is formed of a black-based light-shielding material on the rear-side surface of the meter panel in an area excluding the predetermined zone. The light source emits light of a predetermined color toward the smoke layer on a rear side of the meter panel.

When an ignition switch of a vehicle is off, an external light entering toward a front side of the meter panel is reflected on the smoke layer and the second light shielding layer, and the decorative part and the predetermined zone are, as a whole, viewed through the second opening as being in a ring shape with a width of the second opening and of a color tone based on the smoke layer and the second light shielding layer. When the ignition switch of the vehicle is on and the light source lights, the light of the predetermined color emitted by the light source penetrates the second opening and a portion of the delustered layer corresponding to the first opening. Thus, the predetermined zone is illuminated with the predetermined color with a width of the first opening to be viewed as being wider than the decorative part.

In the above display device, when the ignition switch is off, relative to the delustered layer formed of the delustering material on the surface of the meter panel, the decorative part and the predetermined zone are viewed as a ring-shaped area entirely of a color tone based on the smoke layer and the second light shielding layer. Since the second smoke layer and the light shielding layer are viewed as being of a deep black-based color relative to the delustered layer, the decorative part and the predetermined zone sharply decorate the display part.

When the ignition switch is on, the light source is on. The predetermined zone of the decorative part is illuminated in the predetermined color with the width of the first opening, and is viewed as being wider than the decorative part. Thus, the predetermined zone is viewed as being highlighted against the decorative part.

Thus, the display part, in which the predetermined zone is combined with the decorative part as a part, shows differently between when the ignition switch is off and when the ignition switch is on, and also between the decorative part and the predetermined zone (e.g., sharpness and emphasis). The display device can be generally made capable of presenting a new form of display beyond merely displaying the predetermined zone.

BRIEF DESCRIPTION OF DRAWINGS

The above and other objects, features and advantages of the present disclosure will become more apparent from the following detailed description made with reference to the accompanying drawings, in which:

FIG. 8 is a front view of the decorative part and a red zone when the ignition switch is on.

DESCRIPTION OF EMBODIMENTS

Hereinafter, embodiments of the present disclosure will be described with reference to the drawings. In describing each embodiment, parts described in connection with a preceding embodiment will be denoted by the same reference numbers as used in the preceding embodiment and the descriptions of the parts may be omitted. When only a portion of the configuration of an embodiment is described, the remaining portion of the configuration of the embodiment may be regarded as the same as the corresponding portion of the configuration of a preceding embodiment. Besides portions of embodiments specifically described as being combinable, different embodiments may be partially combined, when combinable without causing any problem, even if they are not specifically described as being combinable.

First Embodiment

Figure 1:
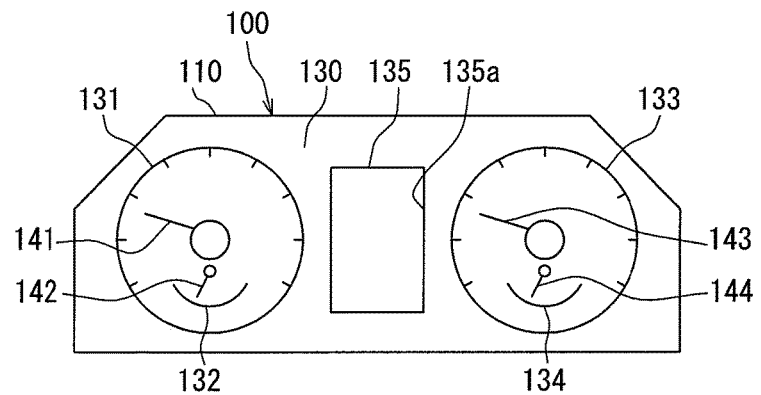
FIG. 1 is a front view illustrating an overall configuration of a combination meter according to a first embodiment.

A first embodiment of the present disclosure will be described with reference to FIGS. 1 to 8. The display device of the first embodiment is included in a vehicular combination meter 100, and displays, for a vehicle user (viewer), various kinds of information associated with the vehicle, such as engine speed, coolant temperature, vehicle speed, and fuel level, as shown in FIG. 1.

The combination meter (hereinafter "meter") 100 is installed, for example, in a center portion of an instrument panel of a vehicle or in a position opposed to the user (driver). The meter 100 includes a case 110, a substrate 120, a meter panel 130, pointers 141 to 144, a motor 151, light sources 161, and the like.

The case 110 is formed as a bottomed cylindrical container made of resin and is, for example, rectangular and extends horizontally in a front view with its upper left and right corners cut off. The case 110 forms the body of the meter 100.

The substrate 120 is formed of, for example, a glass epoxy resin and makes up an electrical circuit of the meter 100. The substrate 120 is, similarly to the frontal shape of the case 110, rectangular and extends horizontally. The substrate 120 is disposed on the bottom side of the case 110 and is fixed to the bottom of the case 110. The substrate 120 carries the motor 151 and the light sources 161, which will be described later.

Figure 2:
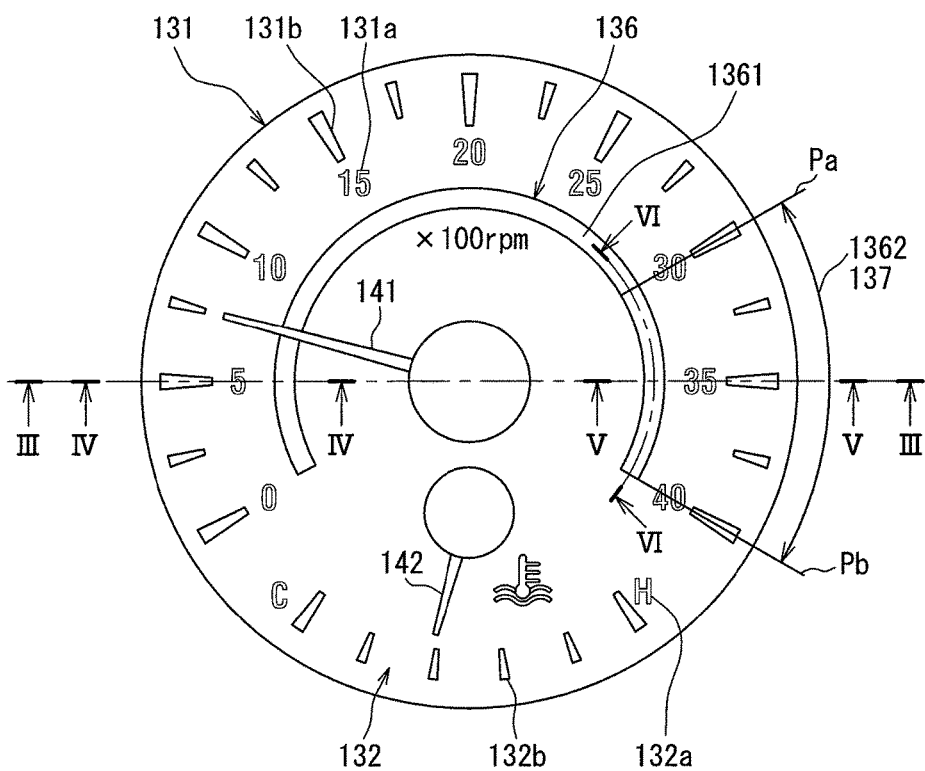
FIG. 2 is a front view of a rotation speed display part.

The meter panel 130 is a thin plate member formed of, for example, transparent polycarbonate or a translucent material such as an acrylic resin and is, similarly to the frontal shape of the case 110, rectangular and extends horizontally. The meter panel 130 is disposed on the open side of the case 110 to be on the user side with respect to the substrate 120 and is fixed to the case 110. The side on the user side (hereinafter "front side") of the meter panel 130 is provided with a rotation speed display part 131, a coolant temperature display part 132, a vehicle speed display part 133, and a fuel level display part 134. In a center portion of the meter panel 130, a vehicular information display part 135 is formed. Also, as shown in FIG. 2, a ring-like decorative part 136 and a red zone 137 are formed radially inside of the rotation speed display part 131.

The rotation speed display part 131 displays the engine speed of the vehicle and is located in a left part of the meter panel 130, as a display part. The rotation speed display part 131 is formed, based on a circle, in a belt-like (an arc-like) area on the outer peripheral side of the circle and extends clockwise from a lower left part to a lower right part. The rotation speed display part 131 includes a numeric part 131a and a graduation part 131b both for displaying the engine speed and adjacently extend in the circumferential direction. In the numeric part 131a, for example, every fifth numeric values (0, 5, 10 ... 40×100 rpm) are indicated in a clockwise ascending order from a lower left part to a lower right part of the rotation speed display part 131.

The coolant temperature display part 132 displays the engine coolant temperature of the vehicle and is located below the rotation speed display part 131. The coolant temperature display part 132 is formed, based on the circular shape of the rotation speed display part 131, in a lower-side belt-like (an arc-like) area on the outer peripheral side of the circular shape. In the coolant temperature display part 132, a letter part 132a for indicating the coolant temperature and a graduation part 132b are formed to adjacently extend in the circumferential direction. The letter part 132a includes letter "C" (cool) indicated in a left part of the coolant temperature display part 132 and letter "H" (hot) indicated in a right part of the coolant temperature display part 132.

The vehicle speed display part 133 displays the traveling speed of the vehicle (vehicle speed) and is located in a right part of the meter panel 130. The vehicle speed display part 133 is formed, based on a circle, in a belt-like (an arc-like) area on the outer peripheral side of the circle and extends clockwise from a lower left part to a lower right part. The vehicle speed display part 133 includes a numeric part and a graduation part both for displaying the vehicle speed and adjacently extend in the circumferential direction. The numeric part includes numeric values indicated in a clockwise ascending order from a lower left part to a lower right part of the vehicle speed display part 133.

The fuel level display part 134 displays the fuel level and is located below the vehicle speed display part 133. The fuel level display part 134 is formed, based on the circular shape of the vehicle speed display part 133, in a lower-side belt-like (an arc-like) area on the outer peripheral side of the circular shape. The fuel level display part 134 includes a letter part and a graduation part both for displaying the fuel level and adjacently extend in the circumferential direction. The letter part indicates, for example, letter "E" (empty) and letter "F" (full).

The numeric part 131a, letter part 132a and graduation parts 131b and 132b included in the above-described display parts 131 to 134 correspond to the information items related with a vehicle.

The vehicular information display part 135 displays, using, for example, a liquid crystal display, various kinds of vehicular information and is located in a center portion of the meter panel 130, that is, between the rotation speed display part 131 and the vehicle speed display part 133. The vehicular information display part 135 is rectangular with longer sides extending vertically. The meter panel 130 is formed with an opening 135a at a position corresponding to the rectangular part so that the screen of the liquid crystal display can be viewed through the opening 135a. The vehicular information display part 135 displays, based on signals obtained from various vehicular sensors, various kinds of vehicular information, for example, selection lever position, mileage, outside air temperature, mileage and travelable distance.

In the meter panel 130, a circular opening 131c is formed in a center portion of the rotation speed display part 131 to have a stem 141a of the pointer 141 inserted through. Similarly, for pointers 142 to 144, too, openings are formed through center portions of the coolant temperature display part 132, vehicle speed display part 133 and fuel level display part 134, respectively.

Also, on the surface defining the user side of the meter panel 130, a light shielding printing paint (e.g., a black paint) is printed (paint-printed) in an area excluding the numeric part 131a, letter part 132a and graduation parts 131b and 132b of the display parts 131 to 134. In other words, the portions where the numeric part 131a, letter part 132a and graduation parts 131b and 132b are formed have not been paint-printed and are left translucent, so that a plurality of light sources provided on the substrate 120 can emit light toward the user.

The decorative part 136 is formed as a narrow ring-like part radially inward of the numeric part 131a and the graduation part 131b of the rotation speed display part 131 to decorate the rotation speed display part 131. In the present disclosure, a "ring-like shape" refers to either a completely circular ring-like shape or a circular ring-like shape lacking a portion. In the present embodiment, the decorative part 136 is formed as a circular ring-like part lacking a portion, namely, forming an arc corresponding to the area from 0 to 40 of the numeric part 131a.

The decorative part 136 includes a first decorative part 1361 corresponding to the area from 0 to 30 of the numeric part 131a and a second decorative part 1362 corresponding to the area from 30 to 40 (Pa-to-Pb area in FIG. 2) of the numeric part 131a. The area of the second decorative part 1362 corresponds to a red zone 137 which will be described later.

The red zone 137 is to represent an engine speed range exceeding a maximum allowable engine speed (rpm). The red zone 37 is formed to be included in the decorative part 136 as a part. Namely, as described above, the red zone 137 is formed as an area corresponding to the second decorative part 1362. The red zone 137 corresponds to the predetermined zone for displaying a predetermined information area.

The decorative part 136 and the red zone 137 are formed of print layers 136a, 136b, 136c, 136d and 136e. The print layers 136a, 136b, 136c, 136d and 136e will be described in detail later.

Figure 3:
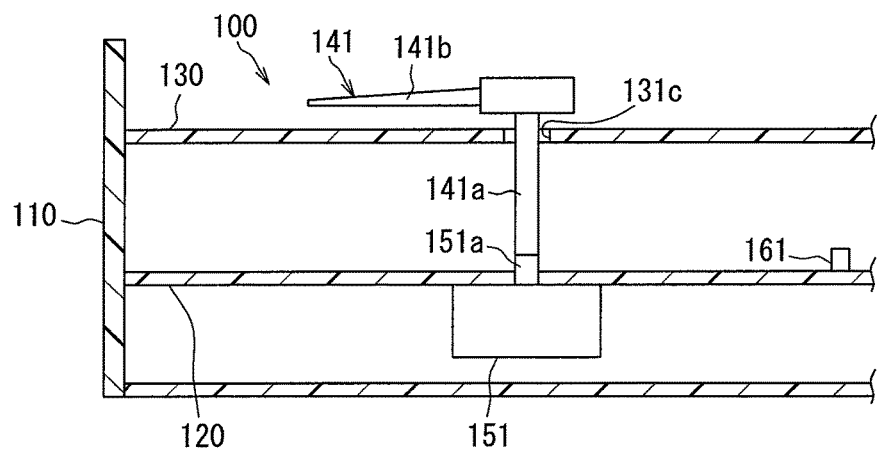
FIG. 3 is a sectional view taken along line III-III in FIG. 2.

The pointer 141 included in the rotation speed display part 131 as shown in FIG. 3 turns pointing to the engine speed. The pointer 141 is formed of a translucent material (e.g. a transparent polycarbonate resin or acrylic resin).

The pointer 141 includes a stem 141a and a needle part 141b. The stem 141a and the needle part 141b are integrally formed. The stem 141a is a rod-like part extending from the front side of the meter panel 130 to the substrate 120 side through the opening 131c of the meter panel 130. The needle part 141b is a needle-like part extending from the end on the user side of the stem 141a toward the graduation part 131b along the side surface of the meter scale 130.

The pointer 142 included in the coolant temperature display part 132 turns pointing to the engine coolant temperature. The pointer 143 included in the vehicle speed display part 133 turns pointing to the vehicle speed. The pointer 144 included in the fuel level display part 134 turns pointing to the fuel level. The pointers 142 to 144 are each configured similarly to the above-described pointer 141.

The motor 151 is a pointer drive part for turning the pointer 141 and is disposed in a left part of the substrate 120 and on the side opposite to the user side of the substrate 120 (opposite-to-user side). The motor 151 is, for example, a stepper motor which, as a synchronous motor, operates in synchronization with pulse power. The motor 151 rotates under the control of a drive circuit provided on the substrate 120.

A shaft 151a of the motor 151 extends toward the stem 141a of the pointer 141 and is connected to the stem 141a. Hence, when the stem 141a is turned by the motor 151, the needle part 141b turns above the meter panel 130 (above the rotation speed display part 131). The pointers 142 to 144 are also configured to be driven by motors to turn above the display parts 132 to 134, respectively.

Figure 6:
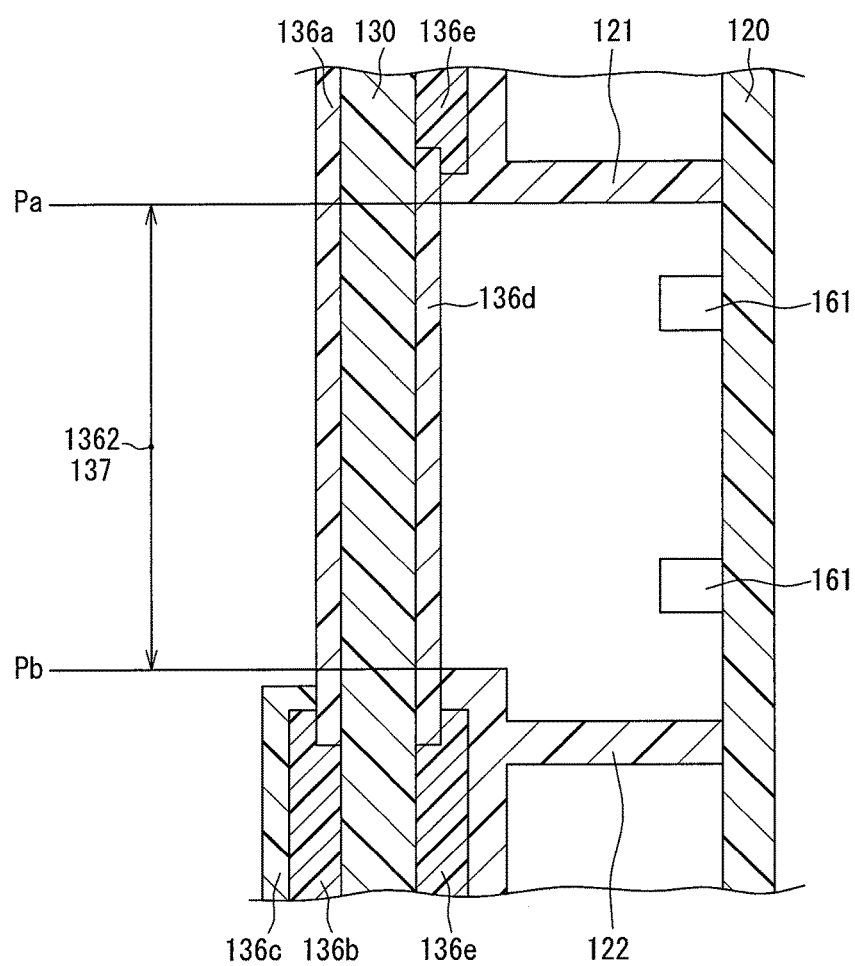
FIG. 6 is a sectional view taken along line VI-VI in FIG. 2.

The light source 161 emits light of a predetermined color toward the red zone 137 (a smoke print layer 136d being described later) of the meter panel 130 and illuminates the red zone 137. The light source 161 is provided on the side of the substrate 120 adjacent to the meter panel 130. The lighting state of the light source 161 can be switched by a drive circuit provided on the substrate 120. The light source 161 is, for example, a red light emitting diode (LEDs) so that the red zone 137 shines, as predetermined, in red. For example, two light sources 161 are provided and arranged in the longitudinal direction of the red zone 137 as shown in FIG. 6.

Besides the light sources 161, light sources for display parts for illuminating the display parts 131 to 134 (numerals, letters, graduations, etc.) and light sources for pointers for illuminating the pointers 141 to 144 are also provided on the substrate 120. To prevent interference between the light sources, for example, partition walls connecting the substrate 120 and the meter panel 130 are provided between the light sources. For the light sources 161, partition walls 121 and 122 are provided (FIG. 6).

Figure 4:
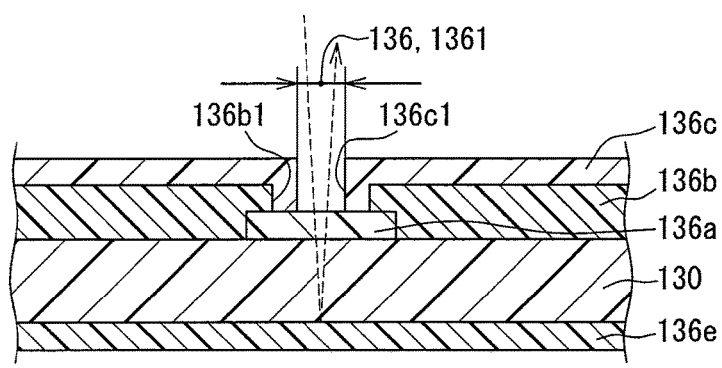
FIG. 4 is a sectional view taken along line IV-IV in FIG. 2.

Next, the print layers 136a, 136b, 136c, 136d and 136e of the decorative part 136 and the red zone 137 will be described in detail with reference to FIGS. 4 to 6. The print layers 136a to 136e are a transparent print layer 136a, light shielding print layer 136b, delustered print layer 136c, smoke print layer 136d and light shielding print layer 136e.

The transparent print layer 136a is printed on the front side of the meter panel 130 to correspond to the decorative part 136, i.e., the first decorative part 1361 and the second decorative part 1362. The transparent print layer 136a is formed of a transparent paint and is translucent. The transparent print layer 136a has a width to be slightly larger than the width of the red zone 137 illuminated by the light sources 161.

The light shielding print layer 136b is formed by printing a light shielding printing paint on the front side of the meter panel 130. The light shielding print layer 136b corresponds to the first light shielding layer, and the light shielding printing paint corresponds to the light-shielding material. The light shielding print layer 136b connects to the print layers forming the above-described numeric part 131a and the graduation part 131b. Namely, the light shielding print layer 136b is printed with a black paint similar to the light shielding printing paint used to form the numeric part 131a and the graduation part 131b.

The light shielding print layer 136b has a portion forming, without being painted (an unpainted portion), an opening in an inside area of the transparent print layer 136a, that is, an opening 136b1. The opening 136b1 corresponds to the first opening. The shape of the opening 136b1 corresponds to the shape of the decorative part 136 (first and second decorative parts 1361 and 1362). The width of the opening 136b1 is slightly smaller than the width of the transparent print layer 136a. The width of the opening 136b1 is the width of the red zone 137 viewed when the red zone 137 shines.

The delustered print layer 136c is formed by printing a delustering printing paint on the surface of the light shielding print layer 136b. The delustered print layer 136c corresponds to the delustered layer and the delustering printing paint corresponds to the delustering material. The delustered print layer 136c has a portion forming, without being painted (an unpainted portion), an opening in an inside area of the opening 136b1, that is, an opening 136c1. The opening 136c1 corresponds to the second opening.

The delustering printing paint is, for example, a transparent paint mixed with light diffusing material and is translucent. The delustering printing paint forms a paint-printed surface delustered like ground glass on the surface of the light shielding print layer 136b. The width of the opening 136c1 is smaller than the width of the opening 136b1 by a predetermined magnitude (e.g. by about 0.5 mm on each side) so as to make up for positional misalignment in printing between the opening 136b1 in the light shielding print layer 136b and the opening 136c1 in the delustering print layer 136c. The width of the opening 136c1 is viewed as the width of the decorative part 136.

As described above, on the front side of the meter panel 130, the print layer configuration is identical between the first decorative part 1361 and the second decorative part 1362 (red zone 137) of the decorative part 136.

The smoke print layer 136d is formed on the rear side of the meter panel 130 by printing at an area corresponding to the second decorative part 1362, i.e. the red zone 137, of the decorative part 136 with a smoke printing paint which is a black-based smoky translucent paint. The smoke print layer 136d corresponds to the smoke layer and the smoke printing paint corresponds to the black-based smoky translucent material. The smoke printing paint is a translucent paint with a low degree of transparency. The width of the smoke print layer 136d is similar to the width of the transparent print layer 136a.

The light shielding print layer 136e is formed, on the rear side of the meter panel 130, by printing at a part corresponding to the decorative part 136 excluding the second decorative part 1362, i.e. excluding the red zone 137, with a black-based light shielding printing paint. The light shielding print layer 136e corresponds to the second light shielding layer and the black-based light shielding printing paint corresponds to the black-based light-shielding material. As shown in FIG. 5, in the light shielding print layer 136e, the area corresponding to the red zone 137 forms an opening 136e1.

As shown in FIG. 6, boundary positions Pa and Pb at the longitudinal ends of the second decorative part 1362, i.e. the red zone 137, are defined (delimited) by the partition walls 121 and 122, respectively.

Next, the operation of the meter 100 based on the above configuration will be described.

When the ignition switch of the vehicle is off, the pointers 141 to 144 are stopped and the light sources are off. In this state, in the decorative part 136 (the first decorative part 1361 and the second decorative part 1362), natural light (external light) enters through the opening 136c1 from the user side as shown by a broken-line arrow in FIGS. 4 and 5.

Figure 5:
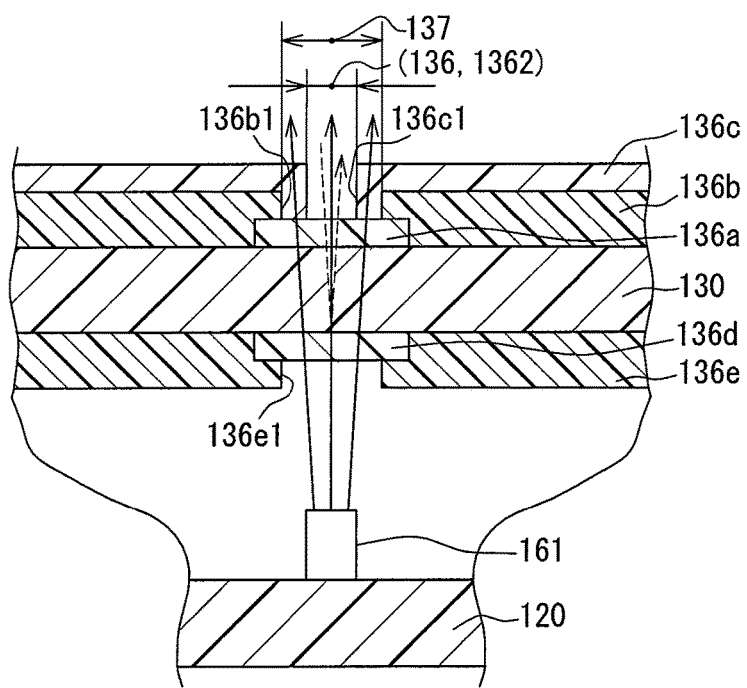
FIG. 5 is a sectional view taken along line V-V in FIG. 2.

The light entering through the opening 136c1 passes through the transparent print layer 136a and the meter panel 130 and is reflected, in the first decorative part 1361, on the black-based light shielding print layer 136e (FIG. 4) and, in the second decorative part 1362, on the smoky (black-based) smoke print layer 136d (FIG. 5). The reflected light then passes through the meter panel 130 and the transparent print layer 136a and is viewed by the user through the opening 136c1.

Figure 7:
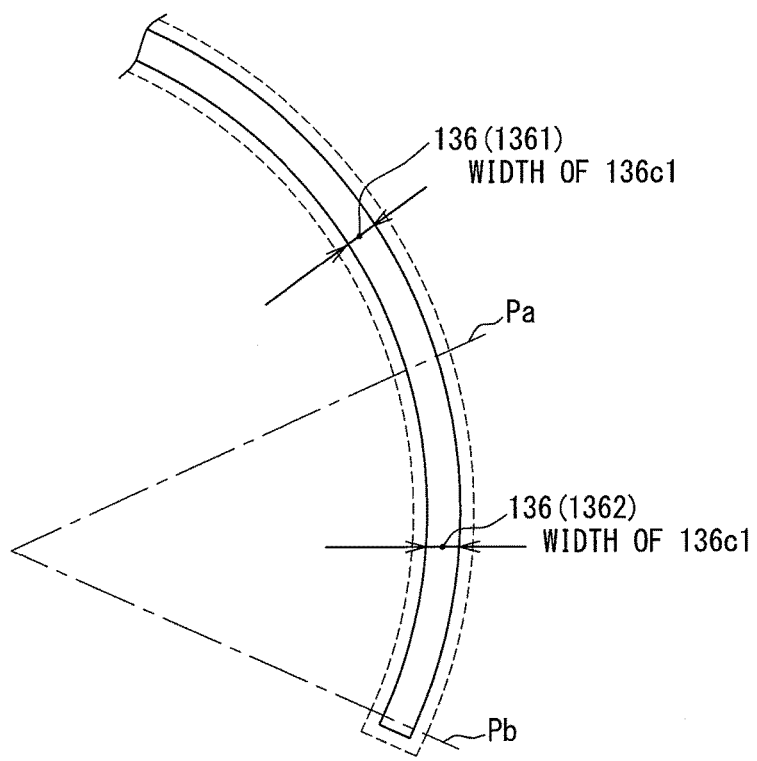
FIG. 7 is a front view of a decorative part when an ignition switch is off.

The light viewed by the user is recognized in a ring-like shape of a color based on the smoke print layer 136d and the light shielding print layer 136e. Namely, the light viewed by the user is the light reflected on the black-based print layers 136d and 136e after traveling away from the user side through the thickness of the print layers 136a, 136b and 136c and the meter panel 130. Hence, compared with the delustered black generated by the light shielding print layer 136b and the delustered print layer 136c on the user side, the light viewed by the user is recognized as deep black or so-called piano black. Namely, as shown in FIG. 7, the decorative part 136 as a whole, including the first decorative part 1361 and the second decorative part 1362, is recognized as a deep-black decorative part with a width equal to the width of the opening 136c1.

On the other hand, when, after the ignition switch is turned on, the vehicle starts traveling, the pointer 141 (needle part 141b) of the rotation speed display part 131 is turned corresponding to the engine speed and points to the engine speed in the numeric part 131a and the graduation part 131b.

Figure 8:
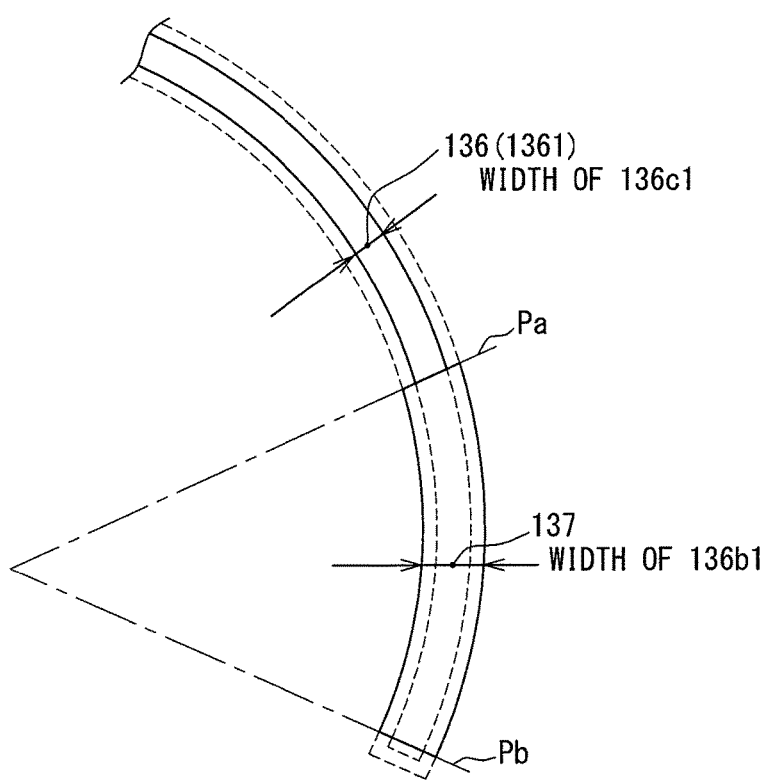

When the ignition switch is turned on, the light sources 161 light. The light emitted from the light sources 161 passes, through the opening 136e1, through the translucent smoke print layer 136d, meter panel 130 and transparent print layer 136a as indicated by solid-line arrows in FIG. 5. The light emitted from the light sources 161 further passes through the opening 136c1 and a portion of the delustered print layer 136c corresponding to the openings 136b1, and illuminated in red with the width of the opening 136b1. At this time, with the partition walls 121 and 122 preventing the light from the light sources 161 from illuminating the first decorative part 1361, the first decorative part 1361 is still viewed as being deep black in color as described above. Namely, as shown in FIG. 8, when the light sources 161 are turned on, the area of the first decorative part 1361 is viewed as being deep black in color as described above and the area of the second decorative part 1362 is viewed as the red zone 137 being red in color. The red zone 137 is viewed as being wider than the first decorative part 1361.

When the ignition switch is turned on, the pointer 142 in the coolant temperature display part 132 is turned corresponding to the temperature of the engine coolant and points to the temperature of the engine coolant in the letter part 132a and the graduation part 132b.

Also, the pointer 143 in the vehicle speed display part 133 is turned corresponding to the vehicle speed and points to the vehicle speed in the numeric part and the graduation part. Also, the pointer 144 in the fuel level display part 134 is turned corresponding to the fuel level and points to the fuel level in the letter part and the graduation part.

Also, in the vehicular information display part 135, various kinds of vehicular information, for example, selection lever position, distance traveled, outside air temperature, mileage and travelable distance are displayed based on signals obtained from various vehicular sensors.

As described above, according to the present embodiment, when the ignition switch is off, relative to the delustered print layer 136c painted with a delustering printing paint on the surface of the meter panel 130, the first decorative part 1361 and the second decorative part 1362 of the decorative part 136 are viewed as a ring-shaped area entirely of a deep black-based color based on the smoke print layer 136d and the light shielding print layer 136e. Since the smoke print layer 136d and the light shielding print layer 136e are viewed as being of a deep black-based color relative to the delustered print layer 136c, the decorative part 136 and the red zone 137 sharply decorate the rotation speed display part 131.

When the ignition switch is on, the light sources 161 are on and the second decorative part 1362 of the decorative part 136 shines red as the red zone 137 with the width of the opening 136b1 and is viewed as being wider than the first decorative part 1361. Thus, the red zone 137 is viewed as being highlighted against the first decorative part 1361.

Thus, with the red zone 137 included as a part of the decorative part 136 in the rotation speed display part 131, the rotation speed display part 131 can be represented differently between when the ignition switch is off and when the ignition switch is on and differentiating the decorative part 136 and the red zone 137 (as to sharpness and emphasis). The meter 100 can generally present a new form of display beyond merely displaying the red zone 137.

Other Embodiments

Figure 9:
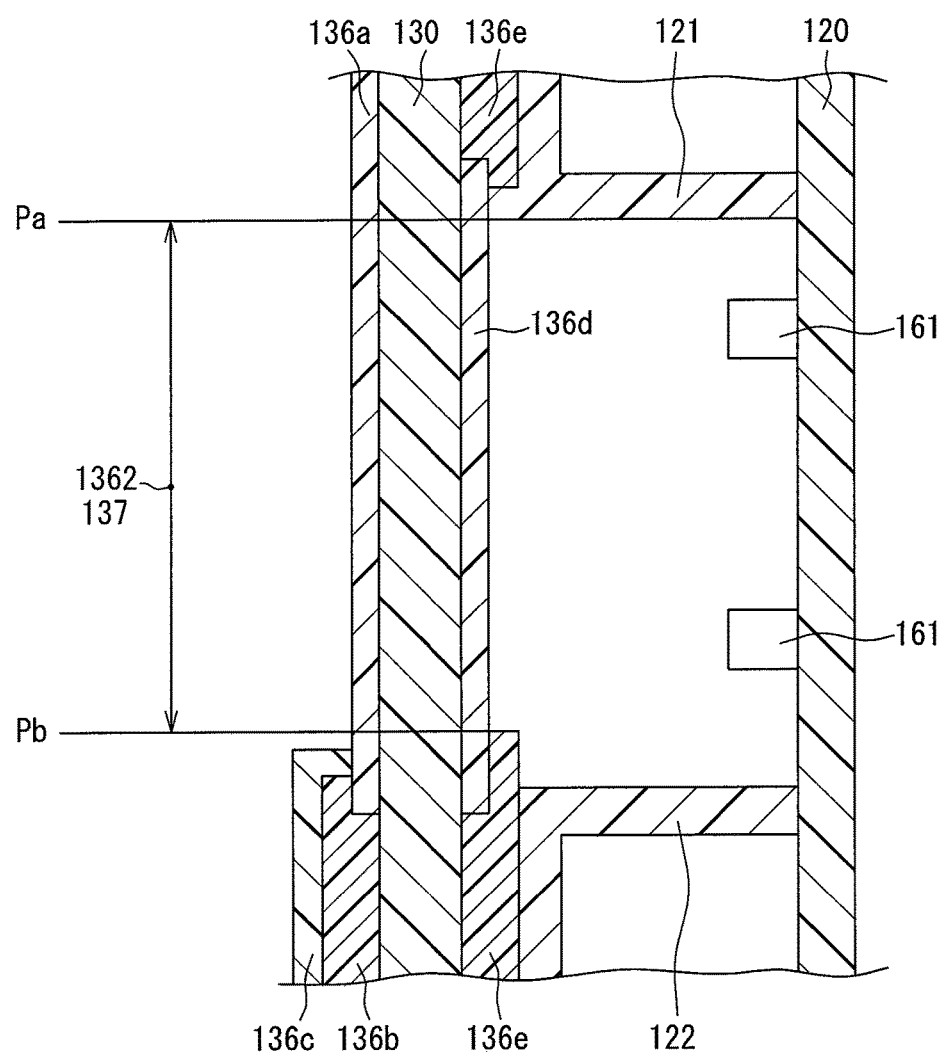
FIG. 9 is a sectional view, according to another embodiment, taken along a line corresponding to line VI-VI in FIG. 2.

According to the first embodiment, the boundary positions Pa and Pb at the longitudinal ends of the red zone 137 are defined (delimited) by the partition walls 121 and 122. However, as shown in FIG. 9, the boundary positions may be defined (delimited) by the ends of the light shielding print layer 136e.

Also, according to the first embodiment, the decorative part 136 and the red zone 137 are formed radially inside of the numeric part 131a and the graduation part 131b of the rotation speed display part 131. However, the decorative part 136 and the red zone 137 may be formed in the graduation part 131b or radially outside of the numeric part 131a and the graduation part 131b.

Even though the decorative part 136 and the red zone 137 as a whole have an arc-like shape, i.e. a circular shape lacking a portion, the decorative part 136 and the red zone 137 as a whole may have a complete circular shape.

Even though the decorative part 136 and the red zone 137 have a single-ring-like shape, the decorative part 136 and the red zone 137 may have a plural-ring-like (e.g., a double-ring-like or triple-ring-like) shape.

Also, even though the decorative part 136 and the red zone 137 are provided in the rotation speed display part 131, the decorative part 136 and the red zone 137 may be applied to, for example, a traveling condition display part for displaying a traveling condition of the vehicle, for example, whether the vehicle is traveling in a charging mode, an economical mode or a powerful mode. For example, a predetermined area of the decorative part may be lit green as an area to indicate that the vehicle is traveling in an economical mode.

Also, the layers 136a, 136b, 136c, 136d and 136e have been described as print layers formed by printing, the layers 136a, 136b, 136c, 136d and 136e may be formed by other means, for example, by painting or by a transfer.

What is claimed is:

1. A display device comprising a display part disposed on a meter panel to display information items related with a vehicle, wherein
   the meter panel is translucent, and
   the display part is formed with a decorative part extending in a circumferential direction of the display part in a ring shape and including, at a part, a predetermined zone to display a predetermined information area, the display device further comprising:
   a first light shielding layer formed of a light-shielding material on a viewable front-side surface of the meter panel, the first light shielding layer having a first opening that defines an opening corresponding to the decorative part;
   a delustered layer formed of a delustering material on a surface of the first light shielding layer, the delustered layer having a second opening that defines an opening in an inside area of the first opening with a width smaller than the first opening;
   a smoke layer formed of a black-based smoky translucent material on a rear-side surface of the meter panel at a position corresponding to the predetermined zone;
   a second light shielding layer formed of a black-based light-shielding material on the rear-side surface of the meter panel in an area excluding the predetermined zone; and
   a light source that is configured to emit light of a predetermined color toward the smoke layer on a rear side of the meter panel, wherein
   when an ignition switch of the vehicle is off, an external light entering toward a front side of the meter panel is reflected on the smoke layer and the second light shielding layer, and the decorative part and the predetermined zone are, as a whole, viewed through the second opening in a shape of ring with a width of the second opening and of a color tone based on the smoke layer and the second light shielding layer, and
   when the ignition switch of the vehicle is on, the light of the predetermined color emitted by the light source penetrates the second opening and a portion of the delustered layer corresponding to the first opening to be illuminated with a width of the first opening so that the predetermined zone is viewed as being wider than the decorative part.

2. The display device according to claim 1, wherein
   when the ignition switch of the vehicle is on, the decorative part is viewed as being of a color tone based on the second light shielding layer.

3. The display device according to claim 1, wherein
   the display part includes a numeric part and a graduation part to indicate the information items, and
   the decorative part and the predetermined zone are disposed radially outside of the numeric part and the graduation part.

4. The display device according to claim 1, wherein
   the display part is a rotation speed display part to display a rotation speed of an engine of the vehicle, and
   the predetermined zone is a red zone representing a range of rotation speed of the engine exceeding a permissible rotation speed.

* * * * *